United States Patent Office 3,759,729
Patented Sept. 18, 1973

3,759,729
CLAY-MINERAL-BEARING SUSPENSIONS
Rudolf Fahn, Moosburg, Germany, assignor to
Sud-Chemie AG, Munich, Germany
No Drawing. Filed Oct. 18, 1971, Ser. No. 190,326
Claims priority, application Germany, Oct. 26, 1970,
P 20 52 506.8
Int. Cl. C04b 7/02
U.S. Cl. 106—90          10 Claims

ABSTRACT OF THE DISCLOSURE

Clay-mineral-bearing suspensions, e.g., of bentonite, of highly increased viscosity are provided by adding thereto, as binding viscous clay-mineral-bearing suspensions containing, as a binding agent, a water-soluble polyethylene oxide with a molecular weight of from about 300,000 to more than about 5,000,000, in amounts of from 0.02 to 0.5 percent by weight, based on the weight of the dry clay mineral.

---

The invention relates to a method of increasing the viscosity of clay-mineral-bearing suspensions, such as bentonite suspensions.

It is known to increase the viscosity of clay-mineral-bearing suspensions, in particular bentonite suspensions, by the addition of carboxymethylcellulose (CMC) which serves as a binding agent or as a consolidating agent. Carboxymethylcellulose is usually used in amounts of from about 0.8 to 1.5 weight percent based on the dry weight of the clay-mineral-bearing substance. Such suspensions are used inter alia as soil stabilization agents, for example in construction engineering, and as a washing fluid in the production of bore-holes.

Clay-mineral-bearing suspensions such as bentonite suspensions are per se thixotropic, that is to say, they stiffen to form a gel if they are left to stand. The viscosity and the gel strength of these suspensions are improved by the addition of carboxymethylcellulose in the specified amounts. However, if these suspensions are combined with cement, as they frequently are in construction engineering, for example when building slit walls, their gel strength is decreased if they include carboxymethylcellulose, for unknown reasons.

It has surprisingly now been found that the viscosity of clay-mineral-bearing suspensions, for example bentonite suspensions, can be increased by use of the instant invention, and that the gel strength of the resulting suspensions is maintained even when cement is added.

Essentially, the instant invention comprises adding to the clay-mineral-bearing suspension, a relatively small amount of a water soluble polyethylene oxide, as a binding agent. Specifically, there is used a water-soluble polyethylene oxide with a molecular weight of from about 300,000 to more than 5,000,000, in amounts of from 0.02 to 0.5% by weight, preferably amounts of from 0.03 to 0.1% by weight, with respect to the weight of the dry clay mineral. The increase in viscosity achieved by use of this invention is surprising insofar as this increase can be achieved by using an amount of polyethylene oxide which only about $\frac{1}{10}$ of the amount of carboxymethylcellulose heretofore used as an additive. It was even found that, upon increasing the amount of polyethylene oxide to more than 0.5 weight percent, the gel strength of the resulting suspensions surprisingly decreased again.

In accordance with the invention, water-soluble polyethylene oxides with molecular weights of 4,000,000 or more are preferably used. The water-soluble polyethylene oxides are thermoplastic, non-ionic poly-(ethylene oxide)-homopolymers, which are unlimitedly soluble in water and whose use, for example, as binding agents, flocculation agents, and for the production of films is known. Suitable polyethylene oxides are marketed, for example, under the name "Polyox" by Union Carbide Corporation.

By virtue of their previous use as flocculation agents, it was to be anticipated that the polyethylene oxides would *reduce* the gel strength of clay-mineral-bearing suspensions. Surprisingly this is not the case when the polyethylene oxides are used in the specified range, in accordance with this invention.

The invention is illustrated by the following examples, which are not to be construed as unduly limitative thereof.

EXAMPLE 1

For the purposes of measuring the increase in viscosity, active bentonite was mixed with various amounts of polyethylene oxide with a molecular weight of about 4,000,000, and 60 parts by weight thereof in one liter of tap water were stirred with a powerful stirrer at 3,000 r.p.m. After a soak time of from 16 to 20 hours, the viscosity values of these suspensions and the amounts of presswater in ml. were measured in a rotary viscosimeter (FANN) under 7 atmospheres of nitrogen after 30 minutes, in comparison with (control) equal concentration suspensions (a) not containing a polyethylene oxide or
(b) with an addition of 1 weight percent of carboxymethylcellulose (CMC), with respect to the bentonite; the following values were determined:

TABLE 1

| Suspension: 100 parts by weight tap water 18° dH,[2] 6 parts by weight active bentonite Tixoton [1] | Active bentonite Tixoton [1] with— | | | | | |
|---|---|---|---|---|---|---|
| | Without additive | CMC [3] | | Polyethylene oxide molecular weight about 4,000,000 | | |
| | | 1.0% | 0.5% | 0.1% | 0.05% | 0.02% |
| Apparent viscosity, cp | 18.0 | 39.0 | 91.0 | 115.0 | 73.5 | 30.0 |
| Plastic viscosity, cp | 4.5 | 1.5 | 86.0 | 56.5 | 21.0 | 6.5 |
| Bingham flow limit, dyn/cm.[2] | 132 | 362 | 48 | 560 | 503 | 228 |
| Press water, ml | 17.5 | 14.1 | 39.0 | 17.5 | 16.0 | 16.5 |

[1] Tixoton is made by Süd-Chemie A6, Munich, Germany.
[2] dH means "deutsche Härte" (German hardness); 1° dH is equivalent to 10 mg. CaO in 1 liter of water.
[3] The carboxymethylcellulose used was the product GTDN/60 made by Montecatini-Edison, Milan, Italy, and the polyethylene oxides were the products Polyox WSR 301 and Polyox Coagulant of Union Carbide Corporation, New York, U.S.A.

EXAMPLE 2

For the tests of Example 2, polyethylene oxide with a molecular weight of about 5,000,000 was used. Production and measurement of the suspensions was effected in the same manner as in Example 1, the values determined being set forth in Table 2.

TABLE 2

| Suspension: 100 parts by weight tap water 18° dH, 6 parts by weight active bentonite Tixoton | Without additive | Active bentonite Tixoton with— | | | | |
|---|---|---|---|---|---|---|
| | | CMC | | Polyethylene oxide moleclar weight about 5,000,000 | | |
| | | 1.0% | 0.5% | 0.1% | 0.05% | 0.02% |
| Apparent viscosity, cp | 18.0 | 39 | 93.5 | 107.5 | 70.5 | 27.0 |
| Plastic viscosity, cp | 4.5 | 1.5 | 83.0 | 43.0 | 21.0 | 5.0 |
| Bingham flow limit, dyn/cm.² | 132 | 362 | 100 | 617 | 474 | 210 |
| Press-water, ml | 17.5 | 14.1 | 36.5 | 20.0 | 19.0 | 18.5 |

EXAMPLE 3

To measure the gel strength, Marsh viscosity and water separation of cement-bearing active bentonite suspensions, 90 parts by weight of active bentonite without and with polyethylene oxide or CMC-additive, respectively, were stirred in two liters of water with about 14° dH, with a powerful stirrer (3000 r.p.m.). After a soak time of 1 hour, the time in seconds of discharge of 946 ml. of suspension out of the Marsh funnel was determined, and the gel strength was measured with a Baroid Shearometer in pounds of shear per 100 square feet (lbs./100 sq. ft.).

Also, as in Example 1, the amount of press-water or the amount of water separated out of the suspension after standing for 24 hours, was determined in ml. The results are set forth in Table 3, below.

TABLE 3

| Suspension: 2,000 parts by weight of tap water 14° dH, 90 parts by weight of active bentonite Tixoton | Without additive | Active bentonite Tixoton with— | | |
|---|---|---|---|---|
| | | CMC, 1.0% | Polyethylene oxide | |
| | | | Mol wt.= 4,000,000, 0.1% | Mol wt.= 5,000,000, 0.1% |
| Gel strength after 1 hour soak time without cement, lbs./100 sq. ft | 6 | 6½ | 5¼ | 5 |
| Marsh viscosity after 1 hour soak time, 946 ml. discharge (seconds) | 33 | 41 | 108 | 125 |
| Press-water, 7 atmospheres after 30 min. (ml.) | 20.5 | 15.0 | 22.0 | 21.0 |
| Gel strength after 1 hour with 150 .. cement, PZ 275/liter, lbs./100 sq. ft | 5¼ | 0 | 4½ | 4½ |
| Marsh viscosity after 1 hour soak time, 946 ml. discharge (seconds) | 51 | 44 | 45 | 47 |
| Water separation after 24 hours (ml.) | 6 | 35 | 11 | 10 |

As in the case of the low-viscosity active bentonite suspensions without additive, in the case of the very high-viscosity active bentonite suspensions with polyethylene additive, a gel strength which is of importance for the building art is maintained after the addition of cement, while in the case of the CMC additive, the gel strength is so low that it can no longer be measured. The originally very high and economical viscosity of the active bentonite suspensions with polyethylene oxide additive is reduced, when cement is added, to about the viscosity without the additive, which favorably influences the capacity for flow of such mixtures, and markedly improves the wetting capacity for example of reinforcing by concrete.

It will be understood that the specification and examples are illustrative but not limitative of the present invention and that other embodiments within the spirit and scope of the invention will suggest themselves to those skilled in the art.

What is claimed is:

1. Viscous clay-mineral-bearing suspensions containing, as a binding agent, a water-soluble polyethylene oxide with a molecular weight of from about 300,000 to more than about 5,000,000, in amount of from about 0.02 to 0.5 percent by weight, based on the weight of the dry clay mineral.

2. Composition as claimed in claim 1, wherein the polyethylene oxide has a molecular weight of at least about 4,000,000.

3. Composition as claimed in claim 1 wherein the polyethylene oxide is used in an amount of from about 0.03 to 0.1 percent by weight, based on the weight of the dry clay mineral.

4. Compositions as claimed in claim 1 wherein the clay mineral is bentonite.

5. Method for increasing the viscosity of clay-mineral-bearing suspensions which comprises adding to such suspension a water-soluble polyethylene oxide with a molecular weight of from about 300,000 to more than about 5,000,000, in amounts of from 0.02 to 0.5 percent by weight, based on the weight of the dry clay mineral.

6. Method as claimed in claim 5 wherein the polyethylene oxide has a molecular weight of at least about 4,000,000.

7. Method as claimed in claim 5 wherein the polyethylene oxide is used in an amount of from about 0.03 to 0.1 percent by weight, based on the weight of the dry clay mineral.

8. Method as claimed in claim 5 wherein the clay mineral is bentonite.

9. Composition as claimed in claim 1 additionally containing cement.

10. Method as claimed in claim 5 wherein cement is additionally mixed into the suspension.

References Cited

UNITED STATES PATENTS

| 3,071,481 | 1/1963 | Beach et al. | 106—90 |
| 3,582,375 | 6/1971 | Tragesser | 106—90 |
| 3,663,251 | 5/1972 | Moren et al. | 106—90 |

JAMES E. POER, Primary Examiner

U.S. Cl. X.R.

106—71, 72, 97, Dig. 4